United States Patent [19]
Runft

[11] 3,918,348
[45] Nov. 11, 1975

[54] ADAPTIVE CONTROL SYSTEM
[75] Inventor: Rudi K. Runft, Warren, Mich.
[73] Assignee: The Cross Company, Fraser, Mich.
[22] Filed: Sept. 18, 1973
[21] Appl. No.: 398,427

[52] U.S. Cl. .................. 90/11 R; 29/568; 82/2 B; 235/151.11; 318/571
[51] Int. Cl.² ........................................ B23Q 15/02
[58] Field of Search ............ 82/2 B, 24 R; 29/568; 90/11 R; 318/571; 235/151.11

[56] References Cited
UNITED STATES PATENTS
| | | | |
|---|---|---|---|
| 3,136,190 | 6/1964 | Musy | 82/24 R |
| 3,191,294 | 6/1965 | Daugherty | 29/568 |
| 3,526,903 | 9/1970 | Brenner et al. | 82/2 B X |
| 3,561,301 | 2/1971 | Sharp et al. | 82/2 B |
| 3,623,216 | 11/1971 | Aihara et al. | 29/568 |

FOREIGN PATENTS OR APPLICATIONS
| | | | |
|---|---|---|---|
| 904,730 | 8/1962 | United Kingdom | 82/2 B |

*Primary Examiner*—Leonidas Vlachos
*Attorney, Agent, or Firm*—Harness, Dickey & Pierce

[57] ABSTRACT

An adaptive control system for a cutting machine or the like which senses the volume or cross-sectional area of an irregular workpiece to be machined prior to machining and alters the feed rate or tool speed to accommodate changes in the volume or cross-sectional area of the workpiece.

37 Claims, 3 Drawing Figures

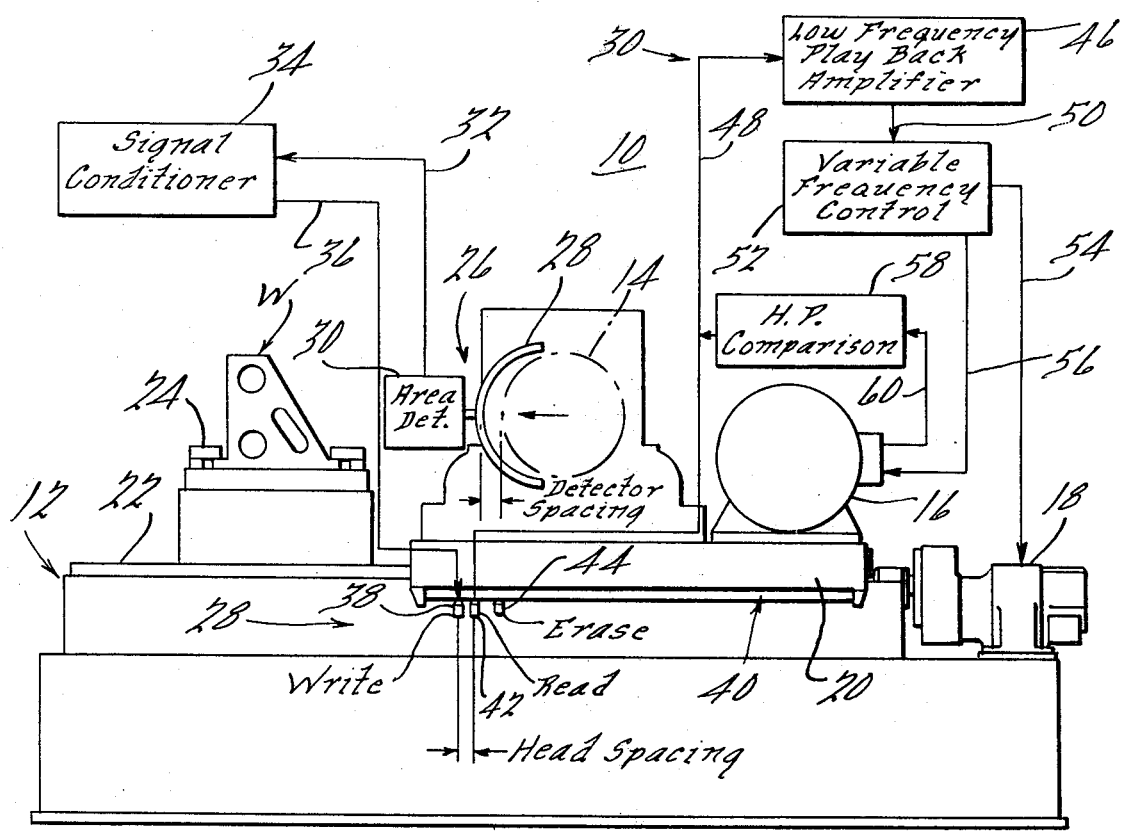
Fig. 1.
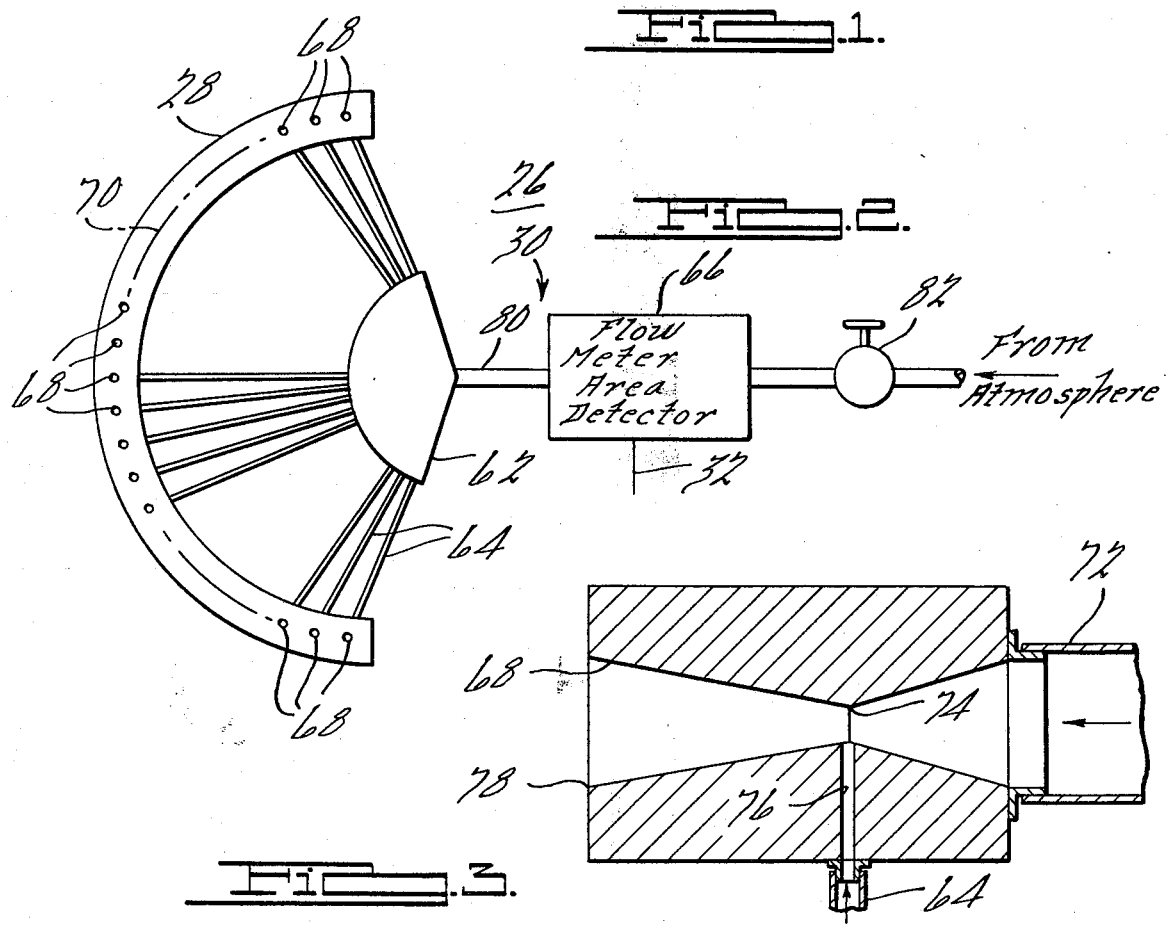
Fig. 2.
Fig. 3.

ADAPTIVE CONTROL SYSTEM

BACKGROUND AND SUMMARY OF THE INVENTION

The present invention relates to adaptive controls for cutting machines generally, and particularly, relates to an adaptive control which senses the volume or cross-sectional area of an irregular workpiece to be machined prior to such machining and adjusts either the feed rate or the tool speed to accommodate changes in the volume or cross-sectional area of the workpiece. In this regard, the feed rate and tool speed of the machine can be adjusted so as to optimize one or more machining parameters, e.g., the feed rate can be adjusted so that the tool progresses at the maximum practical rate, the tool speed and the feed rate can be adjusted to provide a desired level of surface finish, etc.

The adaptive control system of the present invention may be used to great advantage when irregular workpieces are machined which may, for example, have a step or the like which presents a very rapid increase in the volume of the material to be removed. If the tool was allowed to move at a feed rate suitable for removal of a relatively small volume of material and the substantial increase in the volume of material to be removed at the step is not sensed until the step is encountered, the tool could receive a severe shock loading. Shock loading occasioned in the above manner has been found to contribute, if not cause, premature tool failures. These tool failures increase tool costs, may ruin the part being machined, and most importantly, result in an interruption in machine usage for changing of the tool and readjustment of the machine. The present invention avoids such shock loading by altering the feed rate prior to the actual encounter of the tool with the step so that the feed rate and/or tool speed will be at the proper level for the increased volume of material to be machined when the step is encountered. In this regard, one prior art means for automatically adjusting the feed rate adjusts the feed rate in accordance with the horsepower applied to the cutter. However, that means for adjusting the feed rate does not avoid shock loading since the increase in required horsepower is not detected until just after the tool encounters the step and thus, the shock loading has already occurred by that time.

While it is highly important to decrease the feed rate of the tool prior to the encountering of a substantial and abrupt increase in the volume of material to be machined, it may also be desirable to delay an increase in the feed rate of the tool when a substantial and abrupt decrease in the volume of material to be machined is encountered until the tool is within the portion of the lesser volume so as to reduce the loading on the tool. However, a transition from a workpiece area that presents a large volume to be removed to a work-piece area which presents a much smaller volume of material to be removed does not result in the same magnitude of shock loading as described above, i.e. when a substantial and abrupt increase in the volume of material to be removed is encountered.

In the preferred form of the present invention, a cross-sectional area detector is mounted a predetermined distance in advance of the tool so that it senses the cross-sectional area of the workpiece portion to be machined. The width of the cross-sectional area detector is substantially the same as the width of the tool, so that the cross-sectional area detector measures the volume of the material which will be encountered by the tool. The cross-sectional area detector may be a fluid pressure device, a variable-impedance transducer, an acoustic scanner, a capacitance sensor, an inductance sensor, or any other suitable means for detecting the cross-sectional area of a workpiece in advance of a cutting tool. The signal of the cross-sectional area detector is converted into an appropriate signal for recording through a "write" magnetic head on a magnetic medium such as magnetic tape. In the preferred form of the invention, the magnetic tape is mounted on the slide which moves the cutting tool into the workpiece while the magnetic recording head is fixed relative to the base or body of the machine. A "read" head is positioned to read back the signal which is recorded on the tape. The read head is spaced from the write head a distance which is established in accordance with the distance between the cross-sectional area detector and the tool and, preferably, additionally in accordance with the response time of the feed rate mechanism or the tool speed mechanism for purposes to be described. An "erase" head is positioned adjacent to the read head whereby the information which has been written and read will be erased. The read head is connected to a play-back amplifier which converts the recorded signal to a DC signal having a magnitude which is representative of the desired feed rate or tool speed. The DC signal is received by a variable frequency control of known type which converts the analog signal to an AC signal having a frequency in accordance with the magnitude of the DC signal. The AC signal is provided to a frequency responsive motor control which adjusts the feed rate of the workpiece relative to the tool or the tool speed.

Other features and advantages of the present invention will become apparent in view of the detailed description of the preferred embodiment hereinafter.

BRIEF DESCRIPTION OF THE DRAWINGS

FIG. 1 is a block diagram of an adaptive control system according to the present invention shown in combination with a milling machine;

FIG. 2 is an illustration of an exemplary cross-sectional area detector suitable for use with the adaptive control system of FIG. 1; and FIG. 3 is a cross-sectional view of one portion of the cross-sectional area detector of FIG. 2.

DETAILED DESCRIPTION OF THE PREFERRED EMBODIMENT

In FIG. 1, an exemplary adaptive control system 10 according to the present invention is shown in combination with a milling machine 12 and a workpiece W. The workpiece W may have an irregular cross-sectional area exposed to the cutter 14 of the milling machine 12 as shown. The milling machine 12 is provided with a motor 16 which rotatively drives a spindle on which the tool 14 is mounted. The milling machine 12 is further provided with a feed motor 18 which is connected to a slide 20 for advancing the slide 20 relative to a workpiece W. The slide 20 traverses a slide support bed 22 and carries the tool 14 and the motor 16. The workpiece W is fixedly supported relative to the slide support bed 22 by a suitable holding mechanism 24 and is positioned at least partly in the path of the cutter 14 of the milling machine 12 as the cutter 14 is advanced by movement of the slide 20 by the feed motor 18.

The control system 10 includes a volume or cross-sectional area detector 26 for providing a signal representative of the cross-sectional area at locations in advance of the tool, a temporary memory 28 for storing the area signal, and a machine control 30 for adjusting the feed rate and/or tool speed in accordance with the stored area signal.

The cross-sectional area detector 26 may be any known sensor for detecting cross-sectional area or volume of the workpiece W. Preferably, the detector 26 uses a "non-contact" type of sensing unit. For example, the detector 26 may use a fluid flow device such as illustrated in FIGS. 2 and 3, a fluid pressure device, a device for measuring the capacitance between a probe and the workpiece, a device for measuring the inductance between a probe and the workpiece, or a device for emitting an acoustic electromagnetic signal and measuring a characteristic of a signal returned from the workpiece W. The cross-sectional area which is detected should be the area in a curvilinear or planar cross-section which is nominally perpendicular to the direction of feed of the tool 14 relative to the workpiece W. In the case of a circular cutter 14 as illustrated, the cross-section is a semi-cylindrical cross-section having a nominal radius which is the same as the radius of the periphery of the cutter 14. In that manner, each point on the cross-section is the same distance from the corresponding point on the periphery of the cutter 14 as measured along lines which are parallel to the direction of feed. The cross-sectional area sensor 26 is spaced from the cutter 14 a predetermined distance in accordance with practical considerations concerning the external dimensions of the cross-sectional area detector, chip clearance, the spacing requirements of the write and read magnetic heads (described hereinafter), and importantly, the transport lag, i.e., the distance the slide travels before a substantial change in feed rate or cutter speed is effected.

In the embodiment shown in FIG. 1, the detector 26 essentially comprises a scanning unit 28 and a computation unit 30. The scanning unit 28 has a plurality of distance sensors which together provide a plurality of signals. Each such signal is representative of the distance between the respective sensor and the workpiece surface portion opposite the sensor. The computation unit 30 converts the plurality of signals from the individual sensors of the scanning unit 28 into a signal on line 32 which is indicative of the cross-sectional area between the scanning unit 28 and the surface of the workpiece W opposite the scanner, for example, by integration or summation of the plurality of signals, preferably, the signal on line 32 is an analog signal having a magnitude which is inversely representative of the cross-sectional area between the scanning unit 28 and the workpiece W. Since the signal on line 32 is inversely representative of the cross-sectional area between the scanning unit 28 and the workpiece W, and since the cross-sectional area of the workpiece portion to be machined is the complement of that cross-sectional area, the signal on line 32 is directly representative of the cross-sectional area of the workpiece portion to be machined.

The workpiece area signal on line 32 is received by a signal conditioner 34 which converts that signal into an appropriate signal on line 36 for recording on a magnetic medium by a write magnetic head 38. More particularly, the signal on line 36 causes the write head 38 to generate a magnitude flux which imprints a magnetic signal on a magnetic tape 40 which is mounted on the movable slide 20. As the slide advances to the left to move the tool into and through the workpiece W, the area information sensed by the cross-sectional area detector 26 is continuously written on the tape 40.

A read head 42 is spaced a predetermined distance from the write head 38 so as to read the information written by the write head 38 after the slide 20 has traversed the predetermined distance. After the information is read from the tape 40, an erase head 44 removes the recorded information from the tape 40 in a known manner. A low frequency amplifier 46 is connected by a line 48 to the read head 42 to receive the information which was recorded on the tape 40. The low frequency playback amplifier 46 converts the signal on line 48 to a DC signal on line 50 which has a magnitude representative of the signal originally impressed on the tape 40, i.e., the signal on line 32 which is representative of the cross-sectional area of the portion of the workpiece to be machined. However, this signal is delayed by the time it had taken the slide 20 to progress a distance equal to the separation between the write head 38 and the read head 42.

The spacing between the write head 38 and the read head 42 establishes the time delay which occurs prior to the implementation of the area information from the detector 26 by the control system 10. In essence, the write head 38, the read head 42 and the tape 40 comprise a memory system having a storage time which is variable with the feed rate of the slide 20. The storage time is set to allow the tool 14 to traverse nearly the distance between the sensing unit 28 and the tool 14 prior to the reading of the stored area information. Accordingly, the cross-sectional area signals for a particular workpiece portion are implemented by the control 10 just prior to the arrival of the tool at the particular workpiece portion. The control receives the stored signal and adjusts the tool speed or feed rate sufficiently in advance of the arrival of the tool at the particular workpiece portion so that the alteration in tool speed or feed rate will wholly occur, or substantially occur, prior to the arrival of the tool 14 at the particular workpiece portion. In this manner, if a workpiece portion is encountered with sharply increasing cross-sectional area, the slowing of the feed rate, for example, is accomplished before the tool 14 reaches that workpiece portion thereby avoiding shock loading of the tool 14.

The above described signal conditioner 34, write head 38, read head 42, erase head 44, tape 40, and low frequency playback amplifier 46 may be obtained from International Electromagnetics, Inc., Eric Drive and Cornell Avenue, Palatine, Illinois 60067.

The signal on line 50 is received by variable frequency control 52 which in turn provides a signal on line 54 which has a frequency, e.g., between 60 hertz and 12 hertz, in inverse proportion to the magnitude of DC signal on line 50. The feed motor 18 is of the type which is responsive to an oscillating signal and provides a motor speed in direct accordance thereto. Therefore, the slide is advanced in accordance with the frequency of the signal on line 54, i.e., in inverse relation to the signal on line 50 which represents the area of the workpiece portion to be machined.

Since frequency control of drive motors for machine tools is well known, such control systems will not be described in detail herein. It should be noted that the signal from the variable frequency control 52 may also be provided on line 56 to the spindle motor to control the speed of the cutter 14. The speed of the spindle motor 16 can be controlled with or without control of the feed motor 18. Moreover, the signal provided to the respective motors 16 and 18 may be weighted by suitable weighting devices, i.e., which convert the frequency of the signals on lines 54 and 56 to higher or lower frequencies to provide differing rates of variation with changes in the cross-sectional area of the workpiece portion to be machined. The system 10 may optionally include a horsepower comparison unit 58 which receives a signal on line 60 representative of the current drawn by the spindle motor 16 and which is connected to the line 48 so as to override the signal on line 48 and reduce the feed rate of the slide 20 in the event that the spindle motor current exceeds a predetermined value for more than an alloted time. A similar horsepower comparison unit and override may be used in conjunction with the feed motor 18.

In FIG. 2, a cross-sectional area detector 26 is shown which comprises a scanning unit 28 and an area computation unit 30. In the particular embodiment shown, the area computation unit 30 includes a manifold 62 which receives fluid flow signals from the scanner 28 on a plurality of lines 64 and a flow meter cross-sectional area detector 66 which is connected to the manifold 62 to measure the combined or total rate of flow of the combined sensing lines 64.

With reference now to FIG. 3, the sensor 28 includes a plurality of orifices 68 having a venturi cross-section, i.e., a reduced diameter portion intermediate the inlet and outlet openings of the orifice. The orifices 68 are spaced along an arcuate path 70 which has a nominal diameter which is substantially the same as the outer diameter of the cutter 14. The number of orifices 68 may be increased or decreased to increase or decrease the resolution of the sensor 28, i.e., the ability of the sensor to detect area changes in restricted locations. The inlet openings of the orifices 68 are connected to air line 72 to receive relatively high pressure air from a source of high pressure air. The input line 72 may be connected to each of the orifices 68 by individual line connections or through a manifold system in common to all of the inlet openings. Air flow through the orifice 68 will cause a reduced pressure at the reduced diameter section 74 of the orifice 68. A sensing bore 76 connects the reduced diameter portion 74 of each orifice 68 with respective sensing line 64 so that the reduced pressure at the reduced diameter portion 74 causes a flow of air from the line 64 into the orifice 68. The combined flows from the lines 72 and 76 exit through an outlet 78 of each orifice 68. If the outlet 78 of the orifice 68 is partially restricted by the proximate location of a portion of the workpiece, the pressure at the venturi portion 74 will be increased so as to decrease the flow through the passage 76 from the sensing line 64. Consequently, the variations in the distance between the outlet openings 78 of each of the plurality of orifices 68 and the confronting workpiece portion results in variations in the sensing flow through sensing line 64 in direct accordance with the variations in distance. Moreover, the sensing flows through the sensing line 64, when combined, represent the average spacing of the workpiece portion along the arc 70 from the outlets 78 of the orifices 68. This combination of flows occurs at the manifold 62 so as to yield a net flow into the manifold 62 on line 80 which represents the cross-sectional area of the space between the sensing unit 28 and the workpiece W along the arcuate line 70. As previously explained, this flow signal inversely represents the cross-sectional area of the workpiece portion to be machined. The flow signal on line 80 is measured by the flow meter 66 which provides a suitable DC signal on line 32 representative of the rate of flow in the line 80. The cross-sectional area detector 26 may be calibrated by a calibration valve 82 which controls the flow from the atmosphere through the flow meter 66 into the manifold 62.

Although a fluid non-contact cross-sectional area sensor is shown in the preferred embodiment of the adaptive control system 10, it will be appreciated that other sensing units may be employed. Other suitable cross-sectional area detectors are induction sensors which measure the magnitude of flux coupled between a coil in the sensor and the workpiece, a capacitance sensor which detects the magnitude of capacitance between a plate in the sensor and the workpiece, an acoustic sensor which measures the phase of reflected acoustic energy, an electro-optical sensor, and a mechanical feeler-type sensor.

In the operation of the adaptive control system 10, the cross-sectional area measurements as made by the detector 26 are converted by the signal conditioner 34 into suitable form for writing on the magnetic tape 40 by the "write" head 38. The signals representative of the workpiece cross-sectional area in advance of the cutter 14 are continuously written on the tape 40 as the slide 20 advances. After the slide 20 has advanced the distance separating the write and read heads 38 and 42, the read head 42 is brought into position to read the signals which were recorded previously. As previously explained, the delay between the writing of signals by the write head 38 and the reading of signals by the read head 42, as caused by the head spacing, is established in accordance with the distance between the detector sensor 28 and the tool 14, and the time required to adjust the tool speed or feed rate. More particularly, tool speed or feed rate adjustment is initiated at a time in advance of the arrival of the tool at the workpiece portion which occasioned the adjustment so that the adjustment is substantially or fully accomplished at the time that the tool reaches that workpiece portion. In this manner shock loadings of the portion of the tool 14 are avoided during the machining of workpieces having sharply increasing cross-sectional area since the adjustment to feed rate or tool speed is made prior to the encounter between the tool and the workpiece portion having the sharply increasing cross-sectional area.

It may also be desirable to implement a change in tool speed or feed rate subsequent to the time that the tool reaches a portion of the workpiece having a rapidly decreasing cross-sectional area. That mode of operation can be obtained by detecting the rate of change of the signal on line 32. If the rate of change is above a predetermined threshold value, and it is negative, a further delay can be introduced by an ancillary temporary storage unit in the line 36. This delay may be decreased with increasing feed rates so that changes in feed rate are accommodated. Although this alternate mode of control may be implemented, it is not necessarily needed since shock loadings of the tool are not severe if the tool speed or the feed rate is increased to a tool speed or feed rate suitable for a lesser cross-sectional area while the cutter is still in a workpiece portion of larger cross-sectional area.

In view of the above, it will be appreciated that the present invention provides an adaptive control unit which advantageously senses a change in the condition of the workpiece prior to the cutter encountering such change. As a result, a machining parameter such as cutter speed and/or feed rate may be adjusted in advance to avoid detrimental shock loading of the tool.

While it will be apparent that the preferred embodiments of the invention herein disclosed are well calculated to fulfill the objects above stated, it will be appreciated that the invention is susceptible to modification, variation, and change without departing from the proper scope or fair meaning of the subjoined claims.

What is claimed is:

1. For an apparatus for machining a workpiece having a varying cross-sectional area by a machining process including cutting means for removing a portion of said workpiece with the volume of said portion varying with variations in said cross-sectional area and rate means for establishing the rate of the machining process, a control system comprising:

sensing means for sensing said cross-sectional area at a portion of said workpiece to be machined in advance of machining thereof and for providing an output signal representative of said cross-sectional area and hence representative of the volume of said portion to be removed; and control means responsive to said sensing means output signal and operatively associated with said rate means for adjusting the rate of said machining process in accordance with said sensed variations in said cross-sectional area so that said rate of said machine process is decreased with a sensed increase in the cross-sectional area and hence the volume of said portion to be removed and is increased with a sensed decrease in the cross-sectional area and hence the volume of said portion to be removed.

2. A control system according to claim 1 wherein said adjustment of the rate of said machining process is initiated prior to said machining of said portion of said workpiece.

3. A control system according to claim 2 wherein said control means is adapted to substantially complete the adjustment of the rate of said machining process prior to said machining of said portion of said workpiece.

4. A control system according to claim 1 wherein said control means is adapted to substantially complete the adjustment of the rate of said machining process subsequent to said machining of said portion of said workpiece.

5. A control system according to claim 4 wherein said control means is adapted to substantially complete the adjustment of the rate of said machining process subsequent to said machining of said portion of said workpiece.

6. A control system according to claim 1 wherein said control means further includes storing means receiving said sensing means output signal for storing said output signal for a predetermined period and for providing said stored sensing means output signal to said control means at the end of said predetermined period.

7. A control system according to claim 6 wherein said control means establishes said predetermined period in accordance with the rate of said machining process.

8. A control system according to claim 6 wherein said sensing means is spaced a predetermined distance from the portion of said workpiece being machined and wherein said predetermined period is established in accordance with said predetermined distance.

9. A control system according to claim 7 wherein said sensing means is spaced a predetermined distance from the portion of said workpiece being machined and wherein said predetermined period is established in accordance with said predetermined distance.

10. A control system according to claim 1 wherein said control means is adapted to adjust the rate of removal of said portion to be removed.

11. A control system according to claim 1 wherein said cutting means is a tool for machining said workpiece, said tool and said workpiece are relatively movable, and said control means adjusts the rate of said relative movement of said tool and said workpiece in accordance with said sensed variation in said cross-sectional area.

12. A control system according to claim 1 wherein said sensing means senses said varying cross-sectional area of said portion of said workpiece without contacting said portion of said workpiece.

13. A control system according to claim 1 wherein said cutting means is a tool for machining said workpiece and said apparatus includes a feed mechanism for providing relative motion between said tool and said workpiece so that the workpiece is progressively machined, and wherein said feed mechanism includes means for recording said sensing means output signal and for providing said sensing means output signal to said control means for adjusting said machining operation in accordance with said recorded sensing means output signal.

14. For an apparatus including a tool for machining a workpiece having a varying cross-sectional area by a machine process and adjustable means for adjusting the machining process including a feed mechanism having a movable slide for providing relative motion between said tool and said workpiece so that the workpiece is progressively machined, a control system comprising:

sensing means for sensing said cross-sectional area at a portion of said workpiece to be machined in advance of machining thereof and for providing an output signal representative of said cross-sectional area;

recording means including a recording medium disposed on one of said slide and the remainder of said apparatus and a recording member disposed on the other of said slide and said remainder of said apparatus for recording said sensing means output signal and for providing a recorded sensing means output signal; and control means responsive to said recorded sensing means output signal and operatively associated with said adjustable means for adjusting said machining process in accordance with said sensed variations in said cross-sectional area.

15. For an apparatus having a tool for machining a workpiece and rate means for adjusting the rate of machining of said workpiece including a feed mechanism for providing relative motion between the tool and the workpiece so that the workpiece is progressively machined, said workpiece having a varying cross-sectional area so that the amount of workpiece material being removed during said progressive machining varies with variations in said cross-sectional area, a control system comprising:

sensing means for sensing said varying cross-sectional area at a portion of said workpiece to be machined in advance of machining thereof and for providing an output signal representative of said varying cross-sectional area and hence representative of the amount of said workpiece material being removed;

recording means associated with said feed mechanism for recording said sensing means output signal and for retrieving said recorded signal after a predetermined relative movement of said tool and said workpiece to provide a recording means output signal representative of said cross-sectional area; and control means responsive to said recording means output signal and operatively associated with said rate means for adjusting said machining of said workpiece in accordance with said sensed variations in said cross-sectional area so that said rate of machining of said workpiece is decreased in accordance with a sensed increase in the cross-sectional area and hence the amount of workpiece material to be removed from said portion and is increased with a sensed decrease in the cross-sectional area and hence the amount of workpiece material to be removed from said portion.

16. A control system according to claim 15 wherein said control means is adapted to initiate said adjustment of said machining of said workpiece prior to said machining of said portion of said workpiece.

17. A control system according to claim 16 wherein said control means is adapted to substantially complete said adjustment of said machining of said workpiece prior to said machining of said portion of said workpiece.

18. A control system according to claim 15 wherein said control means is adapted to initiate said adjustment of said machining of said workpiece subsequent to said machining of said portion of said workpiece.

19. A control system according to claim 18 wherein said control means is adapted to substantially complete said adjustment of said machining of said workpiece subsequent to said machining of said portion of said workpiece.

20. A control system according to claim 15 wherein said sensing means is spaced a predetermined distance from the portion of said workpiece being machined and wherein said control means is adapted to establish said predetermined relative movement of said tool and said workpiece in accordance with said predetermined distance.

21. A control system according to claim 15 wherein said control means is adapted to adjust the rate of progress of said machining of said workpiece.

22. A control system according to claim 15 wherein said sensing means senses said varying cross-sectional area of said portion of said workpiece without contacting said portion of said workpiece.

23. For an apparatus having a tool for machining a workpiece and adjustable means for adjusting the machining of said workpiece including a feed mechanism having a movable slide for providing relative motion between the tool and the workpiece so that the workpiece is progressively machined, said workpiece having a varying cross-sectional area so that the amount of workpiece material being removed during said progressive machining varies, a control system comprising:

sensing means for sensing said varying cross-sectional area at a portion of said workpiece to be machined in advance of machining thereof and for providing an output signal representative of said varying cross-sectional area;

recording means including a recording medium disposed on one of said slide and the remainder of said apparatus and a recording member disposed on the other of said slide and said remainder of said apparatus for recording said sensing means output signal and for retrieving said recorded signal after a predetermined relative movement of said tool and said workpiece to provide a recording means output signal representative of said cross-sectional area; and control means responsive to said recording means output signal and operatively associated with said adjustable means for adjusting said machining of said workpiece in accordance with said sensed variations in said cross-sectional area whereby said machining of said workpiece is varied in accordance with variations in the amount of workpiece material being removed.

24. A control system according to claim 15 wherein said sensing means provides a fluid flow in the vicinity of said portion of said workpiece and wherein said cross-sectional area influences said fluid flow to provide a measurement of said cross-sectional area.

25. A control system according to claim 24 wherein said sensing means includes an orifice which directs said fluid flow at said portion of said workpiece.

26. For an apparatus having a tool for machining a workpiece and adjustable means for adjusting the machining of said workpiece including a feed mechanism for providing relative motion between the tool and the workpiece so that the workpiece is progressively machined, said workpiece having a varying cross-sectional area so that the amount of workpiece material being removed during said progressive machining varies, a control system comprising:

sensing means including an orifice for providing a fluid flow directed at said portion of said workpiece so that said cross-sectional area influences said fluid flow to provide a measurement of said cross-sectional area at a portion of said workpiece to be machined in advance of machining thereof, said orifice being associated with a venturi flow passage characterized by having a reduced cross-section portion, said sensing means further including means responsive to said pressure at said reduced cross-sectional portion for providing an output signal representative of said varying cross-sectional area;

recording means associated with said feed mechanism for recording said sensing means output signal and for retrieving said recorded signal after a predetermined relative movement of said tool and said workpiece to provide a recording means output signal representative of said cross-sectional area; and control means responsive to said recording means output signal and operatively associated with said adjustable means for adjusting said machining of said workpiece in accordance with said sensed variations in said cross-sectional area whereby said machining of said workpiece is varied in accordance with variations in the amount of workpiece material being removed.

27. A control system according to claim 26 further including a sensing passage connected with said reduced cross-section portion and wherein said means responsive to said pressure at said reduced cross-section portion includes meter means connected to said sensing passage for providing an indication of the flow rate therethrough into said reduced cross-section portion.

28. A control system according to claim 26 wherein said sensing means includes a plurality of said orifices spaced each from the other to measure a cross-section of said workpiece portion and with each having a venturi flow passage characterized by having a reduced cross-section portion and said sensing means further includes means responsive to the pressures at all of said reduced cross-section portions.

29. A control system according to claim 28 further including sensing passage means connected with each of said reduced cross-section portions and wherein said means responsive to the pressure at all of said reduced cross-section portions includes meter means connected to said sensing passage means for providing an indication of the flow rate therethrough into said reduced cross-section portions.

30. A control system according to claim 1 wherein said cutting means is a tool, and said apparatus includes means for providing relative rotation between said tool and said workpiece to machine said portion to be removed and means for providing progressive machining of said workpiece by said tool, and wherein the speed of said relative rotation is increased with a sensed increase in the volume of said portion to be removed to decrease the portion removed on each relative rotation between said tool and said workpiece during said progressive machining thereby decreasing the rate of removal of said portion with said relative rotation and is decreased with a sensed decrease in the portion to be removed to increase the portion removed on each relative rotation between said tool and said workpiece during said progressive machining thereby increasing the rate of removal of said portion with said relative rotation.

31. A control system according to claim 15 wherein said apparatus includes means for providing relative rotation between said tool and said workpiece to machine said portion to be removed and wherein the speed of said relative rotation is increased with a sensed increase in the amount of workpiece material to be removed from said portion to decrease the amount removed on each relative rotation between said tool and said workpiece during said progressive machining thereby decreasing the rate of removal of said material with said relative rotation and is decreased with a sensed decrease in the amount of workpiece material to be removed from said portion to increase the portion removed on each relative rotation between said tool and said workpiece during said progressive machining thereby increasing the rate of removal of said material with said relative rotation.

32. For an apparatus for machining a workpiece having a varying cross-sectional area by a machining process including cutting means, means for providing relative rotation between said cutting means and said workpiece for removing a portion of said workpiece with the volume of said portion varying with variations in said cross-sectional area, and means for providing progressive machining of said workpiece by said cutting means, a control system comprising:

sensing means for sensing said cross-sectional area at a portion of said workpiece to be machined in advance of machining thereof and for providing an output signal representative of said cross-sectional area and hence representative of the volume of said portion to be removed; and control means responsive to said sensing means output signal for adjusting the speed of said relative rotation in accordance with said sensed variations in said cross-sectional area so that the speed of said relative rotation is increased with a sensed increase in the cross-sectional area and hence the volume of workpiece material to be removed from said portion to decrease the volume removed on each relative rotation between said cutting means and said workpiece during said progressive machining and is decreased with a sensed decrease in the cross-sectional area and hence the amount of workpiece material being removed to increase the portion removed on each relative rotation between said tool and said workpiece during said progressive machining.

33. A control system according to claim 32 wherein said adjustment of the speed of said relative rotation is initiated prior to said machining of said portion of said workpiece.

34. A control system according to claim 33 wherein said control means is adapted to substantially complete the adjustment of the speed of said relative rotation prior to said machining of said portion of said workpiece.

35. A control system according to claim 32 wherein said control means is adapted to substantially complete the adjustment of the speed of said relative rotation subsequent to said machining of said portion of said workpiece.

36. A control system according to claim 32 wherein said control means further includes storing means receiving said sensing means output signal for storing said output signal for a predetermined period and for providing said stored sensing means output signal to said control means at the end of said predetermined period.

37. A control system according to claim 36 wherein said sensing means is spaced a predetermined distance from the portion of said workpiece being machined and wherein said predetermined period is established in accordance with said predetermined distance.

* * * * *